United States Patent [19]

MacRae et al.

[11] 4,127,515

[45] Nov. 28, 1978

[54] WAXING SPONGE

[75] Inventors: David M. MacRae, South Plainfield; Karl H. Roberts, Flemington, both of N.J.

[73] Assignee: Colgate-Palmolive Company, New York, N.Y.

[21] Appl. No.: 737,872

[22] Filed: Nov. 1, 1976

Related U.S. Application Data

[63] Continuation of Ser. No. 516,292, Oct. 21, 1974, abandoned.

[51] Int. Cl.$^2$ .................... C08G 18/14; C09G 1/10; C08K 5/10; C08L 75/06
[52] U.S. Cl. ........................................ 521/112; 106/8; 106/10; 521/116; 521/130; 521/159; 521/905
[58] Field of Search .......... 260/2.5 A, 2.5 D, 2.5 AG, 260/2.5 AL; 106/8, 9, 10

[56] References Cited

U.S. PATENT DOCUMENTS

| | | | |
|---|---|---|---|
| 3,393,078 | 7/1968 | Lockhart | 106/8 |
| 3,931,079 | 1/1976 | Wise | 106/8 |

FOREIGN PATENT DOCUMENTS 2,319,706  11/1923  Fed. Rep. of Germany.

OTHER PUBLICATIONS

Warth, *The Chemistry and Technology of Waxes*, Reinhold Pub. Corp., N.Y. 1956; pp. 164 and 433.

*Primary Examiner*—C. Warren Ivy
*Attorney, Agent, or Firm*—Norman Blumenkopf; Herbert S. Sylvester; Murray M. Grill

[57] ABSTRACT

A hydrophilic flexible open-celled poly (urea/urethane) sponge derived from prepolymer produced by reaction of a polyoxyalkylene polyol with a stoichiometric excess of an organic polyisocyanate, said sponge containing uniformly distributed therethrough a readily releasable wax composition, and methods of making and using same for waxing surfaces.

15 Claims, No Drawings

WAXING SPONGE

This is a continuation of application Ser. No. 516,292, filed Oct. 21, 1974, now abandoned.

This invention relates to a synthetic sponge product, and more particularly to a poly (urea/urethane) sponge containing a wax composition, and methods of making and using same for waxing surfaces.

It has of course long been known to improve the appearance of, and/or protect, solid surfaces by applying thereto a wax composition followed if desired by buffing, such application being commonly effected by first supplying a quantity of wax composition to the surface of a fibrous pad or sponge applicator as by wiping the surface of a solid wax composition with said applicator or treating the surface of said applicator with a liquid wax composition, and then transforming said composition to said solid surfaces by wiping and/or rubbing same with the wax-bearing applicator. This method is subject to certain disadvantages, among which are the tiresome and time-consuming repetitive step of first supplying the surface of the applicator with a quantity of the wax composition, the difficulty of controlling the amount of wax composition applied to the surface of the object being waxed, the possibility of temporarily or permanently misplacing the container holding the wax composition; and the like.

It is an object of this invention to provide a device and methods which will not be subject to one or more of the above disadvantages. Another object of the invention is the provision of a device and methods which will more or less eliminate the above-mentioned step of first supplying the surface of the applicator with a quantity of wax composition. Still another object is the provision of means for more accurately and expeditiously controlling the amount of wax applied to said surface of the object. Other objects and advantages will appear as the description proceeds.

The attainment of the above objects is made possible by this invention which includes the provision of a hydrophilic flexible open-celled poly (urea/urethane) sponge derived from prepolymer produced by reaction of a polyoxyalkylene polyol with a stoichiometric excess of an organic polyisocyanate, said sponge containing uniformly distributed therethrough a readily releasable wax composition.

According to a further aspect of this invention, the above-defined sponge is prepared by reacting said prepolymer with an aqueous dispersion of the wax composition containing about 30 to 200% of water by weight of the prepolymer. The water in said dispersion reacts in known manner with isocyanate groups in the prepolymer to release carbon dioxide gas bubbles which produce the desired foam or sponge product containing the in situ impregnated wax composition uniformly distributed therethrough in readily releasable form due to the open pore or cell structure of the product.

According to a still further aspect of the invention, an improved polishing or waxing method is provided simply by rubbing or wiping a solid surface with the above-defined sponge whereby a wax film is deposited on said surface. The sponge can be used repeatedly, additional amounts of wax composition being released each time by suitable squeezing of the sponge. Desirably, the sponge is first moistened with water or other aqueous medium to facilitate release of the wax composition therefrom and to soften the sponge. When the sponge is finally devoid of wax composition, it may be employed in the manner of any ordinary unimpregnated natural or synthetic sponge. The sponge products per se generally have densities of about 3 to 6 lbs./ft.$^3$ and hold 10 to 20 times their own weight of water.

Methods of preparing hydrophilic flexible open celled poly (urea/urethane) sponges or foams from an isocyanate capped prepolymer produced by reaction of a polyoxyalkylene polyol with a stoichiometric excess of an organic diisocyanate, by addition thereto and reaction therewith of suitable proportions of water, expecially relatively large amounts of water ranging from about 30 to 200% by weight of the prepolymer, are known and no claim is accordingly made thereto per se. For example, reference is made to such methods and products disclosed in U.S. Pat. No. 3,833,386, which disclosures are incorporated herein by such reference. Somewhat similar disclosures are to be found in U.S. Pat. No. 3,598,772 and 3,171,820, in "German Plastics Practice" published by Debell and Richardson, 1946, Chapter 21, "Plastic Foams," pages 462–465 and in "Papers Presented at the Atlantic Meeting: Synthesis of Isocyanate Polymers" published by the American Chemical Society, Division of Paints, Plastics and Printing Ink Chemistry, September, 1956. Applicants however claim as their essential inventive concept the inclusion or dispersion of a wax composition, especially those of the type disclosed below, into the said water reactant prior to its addition to and reaction with said prepolymer, thereby enabling the attainment of the desired improved and unexpected results.

According to a preferred embodiment, the isocyanate capped prepolymer is formulated in such a manner as to give crosslinked, three dimensional network polymers on reaction with water to cause foaming, namely by use of a prepolymer having an average isocyanate functionality greater than 2 and up to about 6 or more depending on the composition of the polyol and capping agent components. In general, such prepolymers may be prepared by reacting a polyol having an average hydroxyl functionality greater than 2, such as polyoxyethylenated glycerol, trimethylolpropane, trimethylolethane, tetramethylolbutane, pentaerythritol, or sucrose or mixtures thereof or the like, with a stoichiometric excess of an organic, preferably aromatic, diisocyanate or polyisocyanate or mixture thereof.

Alternatively, any polyoxythylenated polyol or mixture thereof may be reacted with a polyisocyanate having an average isocyanate functionality greater than 2 such as triphenyl methane - 4,4',4"-triisocyanate, benzene-1,3,5-triisocyanate, toluene-2,4,6-triisocyanate, PAPI (Upjohn; polymethylene polyphenylisocyanate having nearly 3 isocyanate groups per molecule and an isocyanate equivalent weight of 133; U.S. Pat. No. 2,683,730), or mixtures thereof or the like.

The polyoxyethylene polyol reactants are water soluble reaction products dervied from the polymerization of ethylene oxide in the presence of a polyhydroxy compound such as water, ethylene glycol, propylene glycol, butylene glycol, diethylene glycol, and the polyhydroxy compounds described above and may have a weight average molecular weight of about 200 to 20,000, preferably about 600 to 6,000. These polyols may contain up to 40 mole percent, preferably up to 25 mole percent or less of a relatively hydrophobic comonomer such as propylene or butylene oxide in the form of a random or block copolymer.

Useful polyisocyanates other than those referred to above include the following diisocyanates: xylene -, chlorophenylene -, diphenylmethane - 4,4' -, naphthalene - 1,5 -, 3,3' - dimethyl - 4,4' - biphenylene -, 2,2',5,5' - tetramethyl - 4,4' - biphenylene -, 4,4' - sulfonylbis (phenyl) -, 4,4' - methylene orthotolyl -, hexamethylene -, ethylene -, trimethylene -, tolyene - diisocyanate, the corresponding isothiocyanates, and the like. The mixed 80/20 tolylene 2,4/2,6 isomers are preferred.

A stoichiometric excess of the polyisocyanate reactant is generally employed to assure complete capping, such as in about a 1.1 to 4:1 preferably about 2 to 3:1 molar ratio of isocyanate to hydroxyl. The reaction may be carried out in an inert moisture-free atmosphere such as under a nitrogen blanket at atmospheric pressure at a temperature in the range of from about 0° C. to about 120° C. for up to 20 or more hours.

In contrast to the usual polyurethane foam reactions involving use of the theoretical one half mole of water per mole of — NCO, the presently preferred process employs from about 30 to 200% of water by weight of the capped prepolymer, or about 6.5 up to about 390 moles of water desirably about 20 to 200 moles of water per—NCO group. This large amount of water aids in enabling the attainment of improved and unexpected results by inclusion therein of increased amounts of the wax composition components, in addition to improvements in the properties of the sponge structure per se.

In accordance with the present invention, the water reactant is employed in the form of an aqueous slurry, dispersion, suspension or oil-in-water emulsion of a wax composition. The wax materials for use in such composition may be of animal, vegetable, mineral, or synthetic origin or type. As is well known, wax in its dispersed form facilitates application of the dispersion or emulsion to a surface to obtain a uniform film having good gloss and water resistance. As examples of some useful waxes, there may be mentioned mineral and paraffin waxes, e.g., microcrystalline and oxidized paraffins, ozocerite and montan wax; animal waxes such as beeswax, whale wax and Chinese insect wax; synthetic waxes such as high boiling aliphatic esters; and vegetables waxes such as candellila, cuticury, ceresin, palm, and carnauba.

Particularly preferred on the basis of their superior performance characteristics are carnauba wax and montan wax, especially mixtures thereof in weight ratios of 2:1 to 1:2. The montan wax may further contain ester groups obtained by esterifying at least part of the acid groups of the wax with, for example, a polyhydric alcohol or $C_{16-13}$ monohydric alcohol. Suitable montan ester waxes are those commercially available as Hoechst wax E,F and OP (American Hoechst Co.). The melting point ranges of these waxes are respectively 169 to 178° F., 162 to 171° F. and 212 to 221° F.; the acid values are respectivey 15 to 20, 6 to 10 and 10 to 15; the saponification values are respectively 140 to 160, 95 to 105 and 100 to 115.

The wax or mixtures of waxes may be present in the water reactant in weight concentrations ranging from about 0.1 to 8%, the optimum amount being readily determinable by routine experimentation in any particular instance depending on the flexibility, porosity and hydrophilicity of the sponge structure, the intended use, and the like. Too high a concentration generally results in a wax film increasingly difficult to buff. Too low a concentration generally results in a wax film which is non-uniform with smears and high and low gloss streaks.

An organosiloxane or "silicone," or mixture of two or more thereof, constitutes a highly effective additive to the wax compositions employed herein. These materials are normally liquids, and should have a viscosity at 25° C. of about 20 to 15,000 centistokes. Those of a viscosity lower than 20 centistokes are usually too volatile and accordingly yield non-durable films. Those having a viscosity exceeding 15,000 centistokes yield films increasingly difficult to buff. As exemplary of suitable silicones, mention is made of dimethyl polysiloxane, diethyl polysiloxane, diphenyl polysiloxane, mixed alkyl polysiloxanes such as methyl-ethyl polysiloxane, block copolymers with, for example, polyoxyethylene and/or polyoxypropylene and the like. When employed in the water reactant herein in weight concentrations of about 0.5 to 9%, the resulting wax-impregnated sponge of the present invention can be wiped on the object being waxed more expeditiously and with less effort; buffing of the resulting wax film is quicker and easier, and the film has improved glaze and resistance to weathering, detergents, dust, water spotting and the like.

In addition, one can employ a surface active organo-polysiloxane such as Union Carbide Silicon 1-520 in the water reactant to stabilize and improve the cell or pore structure of the sponge as it is formed in the foaming step following admixture of the water reactant (aqueous wax composition) with the above described prepolymer.

According to a further preferred embodiment, further improved results are obtained by use of a mixture of (1) an organo-polysiloxane having a viscosity at 25° C. of about 50 to 550 centistokes, and (2) an organo-polysiloxane having a viscosity at 25° C. of about 950 to 15,000 centistokes, the weight ratio of (1) and (2) in such mixture preferably ranging from about 2:1 to 1:3. Such a blend of dimethyl polysiloxanes is commercially available as GE Silicone SF-96.

Another highly effective additive to the aqueous wax compositions employed in the practice of this invention is a surfactant or mixture of surfactants, preferably those which are nonionically or anionically surface active. These surfactants, in addition to stabilizing and improving the foaming reaction, perform multiple functions in the said wax compositions and the resulting sponge products impregnated therewith. Thus, they act as emulsifying or dispersing agents for dispersing the wax in the water reactant medium, facilitate the waxing operation, improve the uniformity of the resulting wax film, and perform a detersive function whereby the surface being treated is simultaneously cleaned and waxed or polished.

Suitable surfactants of the nonionic type include, for example, polyoxyethylenated higher molecular weight reactive hydrogen-containing compounds containing about 6 to 20 or more carbon atoms including fatty acids such as palmitic acid, monohydric and polyhydric aliphatic alcohols such as Oxotridecyl alcohol, oleyl alcohol, lauryl alcohol and polypropylene glycol, and alkyl phenols such as nonyl phenol, and preferably mixtures thereof.

Suitable surfactants of the anionic type include the sodium, potassium, ammonium and amine salts of the sulfate and primary and secondary phosphate esters of the above-mentioned polyoxyethylenated nonionic surfactants, such salts of fatty acids (soaps), or alkyl aryl sulfonic acids such as dodecyl benzene sulfonic acid, of fatty alcohol sulfates and phosphates such as lauryl sulfate and phosphate, of the sarcosinic acids, of lauryl sulfoacetic acid, of N-acyl taurides such as N-oleoyl-N- methyl tauride, of higher ethers and esters of isethionic acid, and the like.

The foregoing surfactants, including mixtures thereof, may be included in the water reactant herein in weight concentrations of about 2 to 12%, the higher ranges of about 6 to 12% being preferred when the above-described simultaneous cleansing function is desired.

Another highly useful additive to the said water reactant, generally in weight concentrations of about 0.02 to 1%, is an emulsion stabilizer, thickener and/or protective colloid such as triethanolamine sulfate, carboxymethylcellulose, polyvinyl pyrrolidone, water insoluble metal soaps, polyacrylic acid, and the water insoluble but water swellable acidic carboxylic cross-linked polymers commercially available as Carbopols and disclosed in U.S. Pat. Nos. 2,798,053, 2,923,692 and 2,980,655.

Other optional additives to the said water reactant include dyes, stains, pigments, UV absorbers (0.02–0.5%), optical brighteners (0.02–5%), antistatic agents (0.03–1%), perfumes, and, to further assist the above-mentioned cleansing function, a finely divided abrasive or mixture thereof in weight concentrations of about 0.25 to 2.5%. Examples of suitable abrasive materials are kaolin, finely divided clay, diatomaceous earth, calcium carbonate, pumice, talc, chromium oxide, iron oxide and the like.

The foaming or sponge-producing reaction between the described aqueous wax composition (water reactant) and the isocyanate-capped prepolymer is carried out in known manner, as by simply and quickly thoroughly mixing them prior to initiation of substantial gas bubble formation, pouring the mixture into a mold, on a moving belt, or the like, and permitting the foam to rise and set. The reaction is exothermic, and may be controlled if desired within a temperature range of about 10 to 100° C. Higher temperatures within this range hasten the reaction, as would the inclusion of known catalysts such as tin compounds such as stannous octoate and amines such as trimethyl amine, N-methyl- and N-ethyl-morpholine and the like.

Following completion of the foaming reaction, generally in about 1 to 10 minutes, the wax impregnated sponge product is preferably dried, if desired under vacuum of 1 to 760 Torr at a temperature of about 0 to 150° C., whereafter the sponge product is useful in the waxing, polishing process of this invention.

The following examples are only illustrative of preferred embodiments of this inventin. All parts and proportions referred to herein and in the appended claims are by weight unless otherwise indicated.

PREPOLYMER A

A solution of 92 grams of glycerol representing 1 mole, 3 eq. OH, and 1000 grams of polyoxyethylene glycol 1000 representing 1 mole, 2 eq. OH is outgassed at 100° C. and 10 Torr for 2 hours. To the outgassed solution is added 870 grams representing 5 moles tolylene diisocyanate consisting of an 80/20 mixture of 2,4/2,6 isomers. The reaction solution is stirred at 60° C. for 4 hours whereupon the actual isocyanate content reaches a constant 2.49 meq. NCO/gram relative to a theoretical content of 2.54. The resin product has a pale orange color, a density of 1.10 and a viscosity (Brookfield No. 4 spindle) at 25° C. of 13,400 cps. 31.3 parts of the resin product representing 50 mole percent has a theoretical molecular weight of 615 as represented by the reaction product of 1 mole of glycerol with 3 moles of tolylene diisocyanate, while 68.7 parts of the resin product representing 50 mole percent has a theoretical molecular weight of 1348 as represented by the reaction product of 1 mole of polyoxyethylene glycol, M.W. 1000, with 2 moles of tolylene diisocyanate.

PREPOLYMER B

The above procedure is repeated except for using a polyoxyethylene glycol having a weight average molecular weight of 4,000. Corresponding results are obtained.

PREPOLYMER C

A slurry of 100 grams of pentaerythritol, 0.735 mole having 2.94 eq. OH in 860 grams of tolylene diisocyanate, 4.95 moles having 9.9 eq. NCO groups/gram and the mixture ratio of 80/20 of 2,4/2,6 isomers is stirred for 24 hours. An orange solution results. To the orange solution is added 1000 grams outgassed polyoxyethylene glycol representing 1 mole having 2.0 eq. OH. These reactants are stirred at about 67° C. for 4 hours followed by additional stirring at 25° C. for 16 hours whereupon the isocyanate content reaches a constant level of 2.63 meq. NCO groups/gram relative to a theoretical value of 2.56. The resultant product has an orange color, a viscous consistency at 25° C., and upon analysis is found to be a solution of about 31 percent by weight (42.5 mole percent) of the reaction product of 1 mole of pentaerythritol with 4 moles of tolylene diisocyanate having a theoretical molecular weight of 832, in about 69 percent by weight (57.5 mole percent) of the reaction product of 1 mole of polyethylene glycol, M.W. 1000 with 2 moles of tolylene diisocyanate having a theoretical molecular weight of 1348.

EXAMPLE 1

| PART I | 6.0 | grams | 10% solution of 1:1 mixture of montan and carnauba waxes in Tween 80* |
|---|---|---|---|
|  | 3.6 | grams | 1:1 mixture of dimethyl polysiloxane fluids 500 cps and 1000 cps |
|  | 1.0 | grams | Carbopol** |
|  | 90 | grams | tap water |
| PART II | 7.5 | grams | Pluronic L.64*** |
|  | 42.5 | grams | tap water |
| PART III | 150 | grams | PREPOLYMER A |

*Condensation product of 20 moles ethylene oxide with 1 mole sorbitan monooleate.
**Carboxylic interpolymer of a monomeric mixture of 98.5% acrylic acid and 1.5% polyallyl ether of sucrose analyzing as having an average of 5.6 allyl groups and 1.97 OH groups per molecule, prepared by the process of Example 2 of U.S. Pat. No. 2,798,053 and neutralized with ammonia to a pH of about 7.0; Goodrich.
***Reaction product of 60% polyoxypropylene glycol, MW. 1750 with 40% ethylene oxide; Wyandotte.

Part I is thoroughly dispersed in Part II, and the resulting mixture added to Part III and vigorously agitated for about 30 seconds. The mix is then poured into a 9 × 9 × 2 inch Teflon coated pan and the foam allowed to rise and set or cure (within about 7–8 minutes). The resulting wax impregnated hydrophilic flexible open-celled poly (urea/urethane) sponge product, desirably after drying at room or elevated temperatures up to 100° C., is found to be highly effective for waxing hard surfaces, with some simultaneous cleaning, over extended periods of time till depleted of wax composition.

EXAMPLE 2

The procedure of Example 1 is repeated using PRE-POLYMER B as Part III. Similar results are obtained.

EXAMPLE 3

The procedure of Example 1 is repeated using PRE-POLYMER C as Part III. Similar results are obtained.

EXAMPLE 4

| PART I | 10 grams | 1:1 mixture of Montan E and carnauba waxes. |
|---|---|---|
|  | 3 grams | Polysorbate 80* |
| PART II | 28 grams | Silicone mixture as in Example 1 |
|  | 666 grams | deionized water |
| PART III | 700 grams | PREPOLYMER A |

*polyethoxylated sorbitan monooleate, I.C.I.

Parts I and II are separately heated to about 200° F., thoroughly mixed together, and the mixture allowed to cool to room temperature. The cooled mixture is added to Part III, vigorously agitated for about 30 seconds, and poured into a large enough Teflon coated mold to permit the resulting foam to rise and set or cure (7–8 minutes). A product similar to that of Example 1 is obtained.

EXAMPLE 5

The procedure of Example 4 is repeated using PRE-POLYMER B as Part III. Similar results are obtained.

EXAMPLE 6

The procedure of Example 4 is repeated using PRE-POLYMER C as Part III. Similar results are obtained.

This invention has been disclosed with respect to preferred embodiments thereof, and it will be understood that various modifications and variations thereof which will become obvious to those skilled in the art are to be included within the spirit and purview of this application and the scope of the appended claims.

We claim:

1. A hydrophilic flexible open-celled poly (urea/urethane) sponge containing uniformly distributed therethrough a readily releasable wax composition, said sponge being produced by mixing and reacting (a) an isocyanate capped prepolymer obtained by reaction of a polyoxyethylene polyol with a stoichiometric excess of an organic polyisocyanate with (b) an aqueous dispersion containing by weight of the prepolymer about 30 to 200% of water as substantially the sole diluent and, by weight of the dispersion, about 0.1 to 8% of a wax and about 2 to 12% of a nonionic polyoxyethylenated polyhydric alcohol surface active agent.

2. A sponge as defined in claim 1 wherein said organic polyisocyanate is tolylene diisocyanate.

3. A sponge as defined in claim 2 wherein said diisocyanate is an 80:20 isomeric mixture of 2,4- and 2,6-tolylene diisocyanate.

4. A sponge as defined in claim 1 wherein said polyoxyalkylene polyol is a polyoxyethylene polyol.

5. A sponge as defined in claim 1 wherein said wax composition contains a mixture of waxes.

6. A sponge as defined in claim 5 wherein said mixture includes montan wax and carnauba wax.

7. A sponge as defined in claim 1 where said dispersion contains an organo polysiloxane liquid.

8. A sponge as defined in claim 1 wherein said dispersion contains a readily water-dispersible acidic carboxylic polymeric protective colloid.

9. A sponge as defined in claim 1 wherein said dispersion contains a mixture of waxes, a plurality of different polyoxyethylene-containing nonionic surface active agents, an organo polysiloxane liquid, and a readily water-dispersible acidic carboxylic polymeric protective colloid.

10. A sponge as defined in claim 7 wherein said polysiloxane liquid has a viscosity at 25° C. of about 20 to 15,000 centistokes and constitutes about 0.5 to 9% by weight of said dispersion.

11. A sponge as defined in claim 10 wherein said polysiloxane liquid comprises a mixture of an organo polysiloxane having a viscosity at 25° C. of about 50 to 550 centistokes with an organo polysiloxane having a viscosity at 25° C. of about 950 to 15,000 centistokes.

12. A sponge as defined in claim 1 wherein said dispersion contains approximately by weight 0.1 to 8% of a mixture of montan and carnauba waxes, 2 to 12% of the nonionic surface active agent, and 0.5 to 9% of a mixture of an organo polysiloxane having a viscosity at 25° C. of about 50 to 550 centistokes with an organo polysiloxane having a viscosity at 25° C. of about 950 to 15,000 centistokes.

13. A sponge as defined in claim 12 wherein said dispersion further contains about 0.02 to 1% of a readily water-dispersible acidic polymeric protective colloid.

14. A sponge as defined in claim 1 wherein said nonionic surface active agent is a polyoxyethylenated polyoxypropylene glycol.

15. A sponge as defined in claim 1 wherein said nonionic surface active agent is polyoxyethylenated sorbitan monooleate.